| United States Patent [19] | [11] Patent Number: 4,535,046 |
| Ksaacson et al. | [45] Date of Patent: Aug. 13, 1985 |

[54] CHLOROALUMINUMPHTHALOCYANINE EXHIBITING REDUCED GREEN SPECTRAL ABSORPTION

[75] Inventors: Henry V. Ksaacson, Webster; Hal E. Wright, Rochester, both of N.Y.

[73] Assignee: Eastman Kodak Company, Rochester, N.Y.

[21] Appl. No.: 509,536

[22] Filed: Jun. 30, 1983

[51] Int. Cl.³ .............................................. G03G 5/06
[52] U.S. Cl. .......................................... 430/78; 430/37
[58] Field of Search .................................... 430/78, 37

[56] References Cited

U.S. PATENT DOCUMENTS 4,241,355 12/1980 Bloom et al. ..................... 430/945
4,415,639 11/1983 Horgan ............................ 430/58 X
4,426,434 1/1984 Arishima et al. ................. 430/128

*Primary Examiner*—John D. Welsh
*Attorney, Agent, or Firm*—David F. Janci

[57] ABSTRACT

A chloroaluminumphthalocyanine (CAP) colorant compound having peak absorption at about 640 nm and reduced absorption below the 640-nm peak are disclosed. CAP is useful as an electrically photosensitive compound in photoelectrophoretic imaging processes.

4 Claims, No Drawings

CHLOROALUMINUMPHTHALOCYANINE EXHIBITING REDUCED GREEN SPECTRAL ABSORPTION

The present invention relates to chloroaluminumphthalocyanine compounds.

In various imaging systems, such as photoelectrophoretic (PEP) imaging systems, photosensitive colorants are employed to provide light sensitivity, as well as faithful reproduction of the light regions to which the colorants are sensitive. In PEP systems, colorants employed are electrically photosensitive and come from a variety of material classes such as phthalocyanine pigments. One of these, cyan-colored chloroaluminum phthalocyanine, is particularly useful for the degree of electrical photosensitivity or speed it provides. However, while it has a good degree of absorption in the red 640-nm spectral region—as required for cyan colorants—it also absorbs undesirably in the 500–600-nm green region. Thus, when chloroaluminumphthalocyanine is employed, for example, in imaging applications with magenta colorants, poor color separation results; i.e. the cyan colorant forms part of and contaminates the magenta image.

In accordance with the present invention, we have discovered a chloroaluminumphthalocyanine having an absorption peak at about 640 nm and reduced green absorption. With absorption normalized to 1.0 at the 640-nm peak, our chloroaluminumphthalocyanines exhibit no greater than 0.7 normalized absorption unit (NAU) at 600 nm and, in a preferred embodiment, also exhibits no greater than 0.4 NAU at 700 nm.

Among other utilities, such as in inks or paints, chloroaluminumphthalocyanines of the present invention are electrically photosensitive and thus eminently suited for use in photoelectrophoretic (PEP) dispersions and elements and processes associated with such dispersions. A PEP dispersion comprises a plurality of particles composed of our chloroaluminumphthalocyanine dispersed in an electrically insulating, liquefiable or liquid carrier.

Our invention is founded upon the discovery of a novel form of chloroaluminumphthalocyanine (which will be referred to for convenience as CAP). CAP is a compound having the following structure:

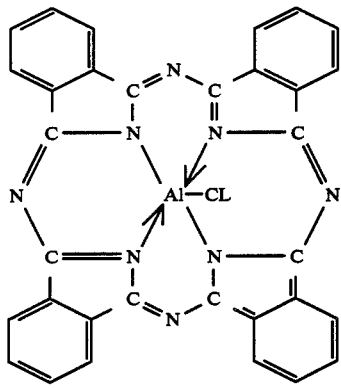

I.

The new form, as noted above, exhibits reduced spectral absorption on the green side of its 640-nm peak absorption. We believe, in this regard, that our CAP represents a novel crystalline structure relative to CAP compounds reported in the literature.

CAP according to the present invention can be prepared by blending prior-art CAP with a polymer matrix containing a condensation polymer or copolymer containing recurring units derived from a bis[4-N-(2-hydroxyethyl)piperidyl]alkane in a fluid-energy mill using a nonsolubilizing liquid and an inert grinding medium.

The polymeric matrix preferably includes (1) one or more of the polymeric binders disclosed in U.S. Pat. Nos. 4,322,487 issued Mar. 30, 1982, to S. H. Merrill et al, the disclosure of which is incorporated herewith by reference, (2) a condensation polymer in which recurring units are derived from a bis-[4-N-(2-hydroxyethyl)-piperidyl]alkane, a difunctional organic acid or phosgene, and, optionally, a bis(N,N-dialkylamino)-triarylmethane and (3), optionally, a polyesterionomer disclosed as the binder polymer in U.S. Pat. No. 4,361,636 issued Nov. 30, 1982, to H. V. Isaacson, the disclosure of which is incorporated herewith by reference. The resulting composite particles are prepared in the foregoing manner by dissolving the binder polymers in methylene chloride and dispersing CAP in the binder solution. The resulting composition is milled for up to five days with ⅛" stainless-steel balls. The milled composition is then added to Isopar G ™ (an isoparafinic hydrocarbon) to form a dispersion of precipitated composite particles containing CAP according to our invention.

While the above blending technique is useful to produce our novel form of CAP compounds, the procedure is expected also to sharpen the spectral absorption peak of chloroaluminumchlorophthalocyanine (CACP) compounds wherein the phthalocyanine ring of Structure I is chlorinated on one or more of the fused benzene rings.

The following examples are provided to aid in the practice of the present invention:

EXAMPLE 1

This example illustrates the preparation of CAP according to the present invention.

Composite particles were prepared by milling 30 mL methylene chloride containing 1.0 gram CAP and 0.5 gram poly(di-p-tolylaminostyrene-co-lauryl methacrylate-co-lithium methacrylate-co-methacrylic acid) 60/36/3.6/0.4 and the following constituents:

| Composite | Binder(s) | Weight |
| --- | --- | --- |
| A-Control | (a) poly[4,4'-bis(N—ethylene-N—ethylamino)-2,2'-dimethyltriphenylmethane-co-tetramethylene terephthalate-co-3,3'-sodioiminobis(sulfonylbenzoate)] | 0.5 gram |
| | (b) poly(vinylpyrrolidone-co-vinyl acetate) | 0.5 gram |
| B | (a) poly[4,4'-bis(N—ethylene-N—ethylamino)-2,2'-dimethyltriphenylmethane-co-tetramethylene terephthalate-co-3,3'-sodioiminobis(sulfonylbenzoate)] | 0.5 gram |
| | (b) poly[1,3-bis(4-(N—ethylene)-piperidyl)propane-3,5-pyridicarboxylate] | 0.5 gram |
| C | (a) poly[4,4'-bis(N—ethylene-N—ethylamino)-2,2'-dimethyltriphenylmethane-co-tetramethylene terephthalate-co-3,3'- | 0.5 gram |

| Composite | Binder(s) | Weight |
|---|---|---|
| | sodioiminobis(sulfonylbenzoate)] | |
| | (b) poly[1,3-bis(4-(N—ethylene)-piperidyl)propane carbonate] | 0.5 gram |
| D | (a) poly[1,3-bis(N—ethylene-4-piperidyl)propane-co-4,4'-bis(N—ethyl-N—ethyleneamino)-2,2'-dimethyltriphenylmethane terephthalate | 1.0 gram |

The milled methylene chloride concentrates were added to Isopar G TM in a concentrate-to-Isopar G TM volume ratio of 1 to 10, resulting in a dispersion of composite particles in Isopar G TM.

EXAMPLE 2

This illustrates the absorption spectra of CAP of the prior art compared with CAP according to the present invention.

Absorption, normalized to 1.0 at 640 nm, was determined at 550, 600, 640 and 700 nm. The Isopar G TM dispersions of Example 1 containing composites A–D were handcoated on the top layer of respective reflective supports and the reflection absorption spectra of the dispersions measured. The reflective supports comprised a polyester substrate, a titanium dioxide-polyurethane layer coated on the substrate, and a cellulose acetate top layer coated over the titanium dioxide-polyurethane layer. Results are reported in Table 1.

TABLE I

| CAP | Normalized Absorption Units | | | |
|---|---|---|---|---|
| | 550 nm | 600 nm | 640 nm | 700 nm |
| A-Control (prior art) | 0.37 | 0.8 | 1.0 | 0.9 |
| B | 0.2 | 0.6 | 1.0 | 0.3 |
| C | 0.2 | 0.65 | 1.0 | 0.4 |
| D | 0.15 | 0.4 | 1.0 | 0.3 |

The results indicated that our CAP has reduced green spectral absorption, and preferably reduced absorption above the 640-nm peak as well. CAP according to the invention, moreover, has been confirmed by X-ray diffraction analysis as having a novel crystalline form compared with prior-art CAP. The X-ray powder diffraction pattern of chloroaluminumphthalocyanine according to the invention is characterized by peaks at diffraction angles ($2\theta$) of 6.84, 11.27, 14.07, 16.26, 16.84, and 25.24 degrees.

The invention has been described in detail with particular reference to preferred embodiments thereof, but it will be understood that variations and modifications can be effected within the spirit and scope of the invention.

We claim:

1. Chloroaluminumphthalocyanine which, when formed into composite particles and dispersed into Isopar G TM, as described in Example 1 herein, and the resulting dispersion is coated on a reflective support as described in Example 2 herein, exhibits a spectral absorption peak of 1.0 normalized absorption unit at about 640 nm and an absorption of no greater than 0.7 normalized absorption unit at 600 namometers.

2. A chloroaluminumphthalocyanine as in claim 1 having no greater than 0.4 normalized absorption unit at 700 nanometers.

3. A method of producing chloroaluminumphthalocyanine having reduced green spectral absorption comprising (a) forming a solution of a condensation polymer or copolymer containing recurring units derived from a bis[4-N-(2-hydroxyethyl)piperidyl]alkane in a liquid in which said chloroaluminumphthalocyanine is insoluble and (b) blending chloroaluminumphthalocyanine with said solution whereby there is obtained chloroaluminumphthalocyanine which, when formed into composite particles and dispersed into Isopar G TM, as described in Example 1 herein, and the resulting dispersion is coated on a reflective support as described in Example 2 herein, exhibits a spectral absorption peak of 1.0 normalized absorption unit at about 640 nm and an absorption of no greater than 0.7 normalized absorption unit at 600 namometers.

4. Chloroaluminumphthalocyanine having a copper k-$\alpha$ radiation X-ray powder diffraction pattern characterized by peaks at diffraction angles $2\theta$ of 6.84, 11.27, 14.07, 16.26, 16.84, and 25.24 degrees.

* * * * *